(12) United States Patent
Jung (10) Patent No.: US 11,626,604 B2
(45) Date of Patent: Apr. 11, 2023

(54) CONCENTRATION REDUCING APPARATUS AND CONCENTRATION REDUCING APPARATUS FOR FUEL CELL VEHICLE

(71) Applicants: Hyundai Motor Company, Seoul (KR); Kia Corporation, Seoul (KR)

(72) Inventor: Il Won Jung, Jeollanam-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/375,376

(22) Filed: Jul. 14, 2021

(65) Prior Publication Data

US 2022/0190369 A1 Jun. 16, 2022

(30) Foreign Application Priority Data

Dec. 11, 2020 (KR) .................. 10-2020-0173766

(51) Int. Cl.
*H01M 8/04* (2016.01)
*H01M 8/04746* (2016.01)
*H01M 8/0662* (2016.01)
*H01M 8/04089* (2016.01)

(52) U.S. Cl.
CPC ... *H01M 8/04761* (2013.01); *H01M 8/04089* (2013.01); *H01M 8/0662* (2013.01); *H01M 2250/20* (2013.01)

(58) Field of Classification Search
CPC ......... H01M 8/04761; H01M 8/04089; H01M 8/0662
See application file for complete search history.

(56) References Cited

U.S. PATENT DOCUMENTS

| | | | |
|---|---|---|---|
| 7,678,487 B2 | 3/2010 | Numata et al. | |
| 2013/0337366 A1* | 12/2013 | Blanchet | H01M 4/861 |
| | | | 156/196 |
| 2018/0120257 A1* | 5/2018 | Asiri | G01N 27/308 |
| 2018/0175405 A1* | 6/2018 | Jo | H01M 8/0258 |

FOREIGN PATENT DOCUMENTS

| | | |
|---|---|---|
| JP | 2009-277670 A | 11/2009 |
| JP | 4667776 B2 | 4/2011 |
| KR | 100831465 B1 | 5/2008 |

* cited by examiner

*Primary Examiner* — Olatunji A Godo
(74) *Attorney, Agent, or Firm* — Fox Rothschild LLP (57) ABSTRACT

A concentration reducing apparatus for a fuel cell vehicle includes: a body having an inner flow path through which an exhaust gas containing a target fluid flows in a predetermined discharge direction, in which the body is made of a porous material that allows a selective discharge of the target fluid in order to selectively discharge the target fluid to an outside of the body.

14 Claims, 6 Drawing Sheets

CONCENTRATION REDUCING APPARATUS AND CONCENTRATION REDUCING APPARATUS FOR FUEL CELL VEHICLE

CROSS-REFERENCE TO RELATED APPLICATION

This application claims under 35 U.S.C. § 119(a) the benefit of Korean Patent Application No. 10-2020-0173766 filed in the Korean Intellectual Property Office on Dec. 11, 2020, the entire contents of which are incorporated herein by reference.

BACKGROUND

(a) Technical Field

The present disclosure relates to a concentration reducing apparatus for a fuel cell vehicle, more particularly, to the concentration reducing apparatus that reduces a concentration of a predetermined fluid measured at a downstream end of a discharge tube.

(b) Description of the Related Art

A fuel cell system, which is applied to a hydrogen fuel cell vehicle, includes a fuel cell stack configured to generate electrical energy from an electrochemical reaction between reactant gases (hydrogen, which is fuel, and oxygen, which is an oxidant), a hydrogen supply device configured to supply hydrogen to the fuel cell stack, and an air supply device configured to supply air containing oxygen to the fuel cell stack.

The fuel cell system further includes a discharge tube for discharging an exhaust gas, which is a by-product produced from the electrochemical reaction between the reactant gases supplied to the fuel cell stack, to an outside of the fuel cell system. The exhaust gas typically contains hydrogen gas, air, and vapor. Because the hydrogen gas is highly flammable, there are regulations governing the concentration of the hydrogen gas measured at a downstream end of the discharge tube.

In particular, when a purging operation is performed on a hydrogen electrode of the fuel cell stack in order to improve quality of the hydrogen in the fuel cell stack, there may be a risk of explosion due to an increase in concentration of the hydrogen gas. Accordingly, various structures and methods are provided to reduce a concentration of the hydrogen gas at the end of the discharge tube.

SUMMARY

The present disclosure relates to a concentration reducing apparatus for a fuel cell vehicle, in particular, to the concentration reducing apparatus that reduces a concentration of a predetermined fluid measured at a downstream end of a discharge tube.

In one aspect, the present disclosure provides a concentration reducing apparatus including: a body having an inner flow path through which an exhaust gas containing a target fluid flows in a predetermined discharge direction, in which the body is made of a porous material that allows a selective discharge of the target fluid in order to selectively discharge the target fluid to an outside of the body.

The concentration reducing apparatus may further include: a partition including: a partition wall configured to block the inner flow path to divide the inner flow path into a first flow path part and a second flow path part in the discharge direction; and a partition wall hole formed in the partition wall and provided to allow the exhaust gas to pass through the partition wall hole in the discharge direction, in which the partition is provided to make an internal pressure of the first flow path part higher than an internal pressure of the second flow path part.

The partition wall hole may have a diameter smaller than an inner diameter of the inner flow path so that the internal pressure of the first flow path part is higher than the internal pressure of the second flow path part.

When a size of a fine hole of the body, which is provided to allow the target fluid to pass through the fine hole, is referred to as a pore size, the body may have the pore size of 10 μm to 100 μm so that hydrogen, which is the target fluid, passes through the fine hole.

When a size of a fine hole of the body, which is provided to allow the target fluid to pass through the fine hole, is referred to as a pore size, a first body of the body, which corresponds to the first flow path part, and a second body of the body, which corresponds to the second flow path part, may be provided to allow the target fluid to pass therethrough and have different pore sizes such that an amount of the target fluid discharged from the first body is different from an amount of the target fluid discharged from the second body.

The pore size of the first body may be larger than the pore size of the second body so that the amount of the target fluid discharged to an outside of the first body through the first body from the first flow path part is larger than the amount of the target fluid discharged to an outside of the second body through the second body from the second flow path part.

The body may have a thickness of 2 mm to 20 mm.

A length of the first flow path part in the discharge direction may be different from a length of the second flow path part in the discharge direction so that the amount of the target fluid discharged from a first body of the body, which corresponds to the first flow path part, is different from the amount of the target fluid discharged from a second body of the body, which corresponds to the second flow path part.

The concentration reducing apparatus may include: a first partition and a second partition configured to block the inner flow path and disposed in the inner flow path so as to be spaced apart from each other in order to divide the inner flow path into a first flow path part, a second flow path part, and a third flow path part in the discharge direction, in which the first partition includes: a first partition wall configured to block the inner flow path; and a first partition wall hole penetratively formed in the first partition wall, and in which the second partition includes: a second partition wall spaced apart from the first partition wall in the discharge direction and configured to block the inner flow path; and a second partition wall hole penetratively formed in the second partition wall.

A diameter of the first partition wall hole of the first partition may be different from a diameter of the second partition wall hole of the second partition so that an internal pressure of the first flow path part, an internal pressure of the second flow path part, and an internal pressure of the third flow path part are different from one another.

A distance between the first partition and the second partition spaced apart from each other may be 10 mm to 1,000 mm.

The body may include: a first body having the first flow path part and made of a porous material; and a second body disposed to be spaced apart from the first body in the discharge direction, having the second flow path part, and made of a porous material, and in which the partition disposed between the first and second bodies further includes a pair of connecting members extending from a rim of the partition wall toward the first and second bodies and provided such that a downstream end of the first body and an upstream end of the second body are fitted into the pair of connecting members, respectively.

The body may include: a first body having the first flow path part and made of a porous material; and a second body disposed to be spaced apart from the first body in the discharge direction, having the second flow path part, and made of a porous material, and in which the partition disposed between the first and second bodies further includes: a pair of first connecting members extending from a rim of the partition wall toward the first and second bodies; and a pair of second connecting members disposed to be spaced apart from the first connecting member toward the partition wall hole and extending from the partition wall toward the first and second bodies, such that a downstream end of the first body and an upstream end of the second body are fitted between the first connecting members and the second connecting members.

In another aspect, the present disclosure provides a concentration reducing apparatus for a fuel cell vehicle, the concentration reducing apparatus including: a body having an inner flow path through which an exhaust gas, in a fuel cell vehicle, containing a hydrogen gas flows in a predetermined discharge direction; and a partition including: a partition wall configured to block the inner flow path to divide the inner flow path into a first flow path part and a second flow path part in the discharge direction; and a partition wall hole formed in the partition wall and provided to allow the exhaust gas to pass through the partition wall hole in the discharge direction, in which the body is made of a porous material that allows a selective discharge of the hydrogen gas in order to selectively discharge the hydrogen gas to an outside of the body.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the illustrative drawings. In giving reference numerals to constituent elements of the respective drawings, the same constituent elements will be designated by the same reference numerals, if possible, even though the constituent elements are illustrated in different drawings. Further, in the following description of the exemplary embodiments of the present disclosure, a detailed description of publicly known configurations or functions incorporated herein will be omitted when it is determined that the detailed description obscures the subject matters of the exemplary embodiments of the present disclosure.

Embodiment 1

Structure of Concentration Reducing Apparatus

Figure 1:
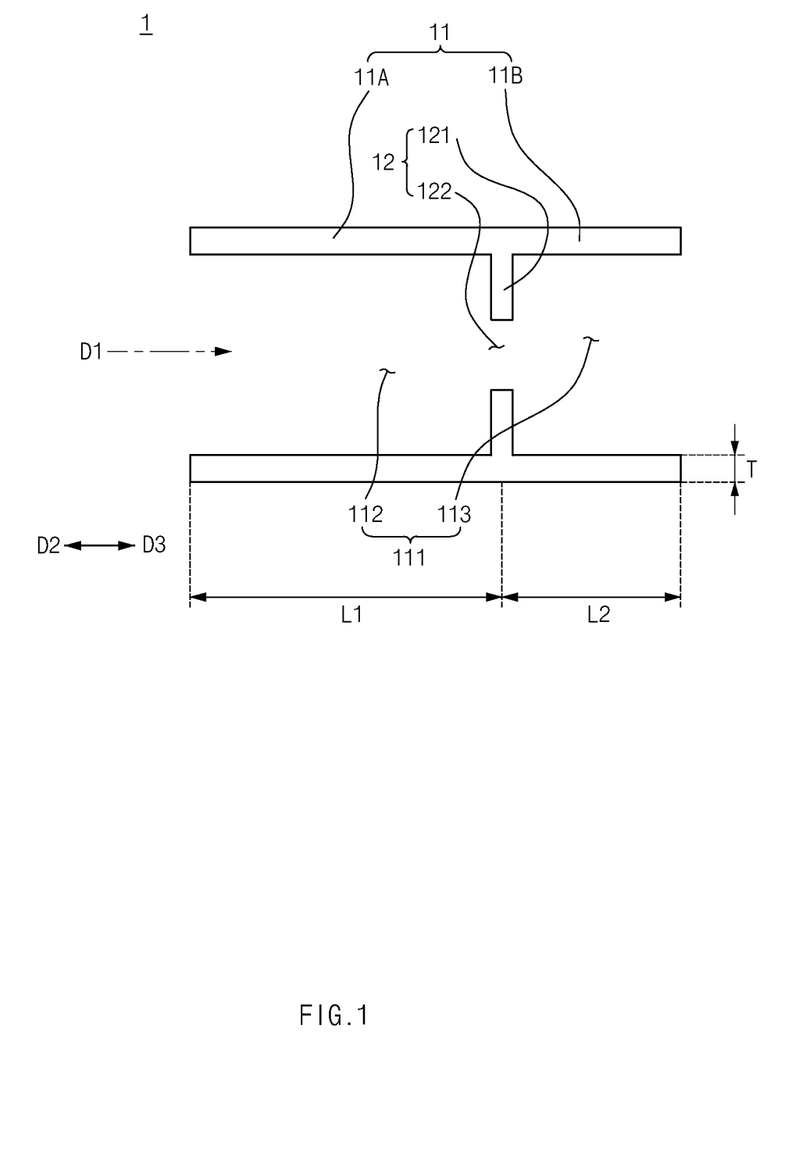
FIG. 1 is a cross-sectional view illustrating a concentration reducing apparatus according to Embodiment 1 of the present disclosure.
Figure 2:
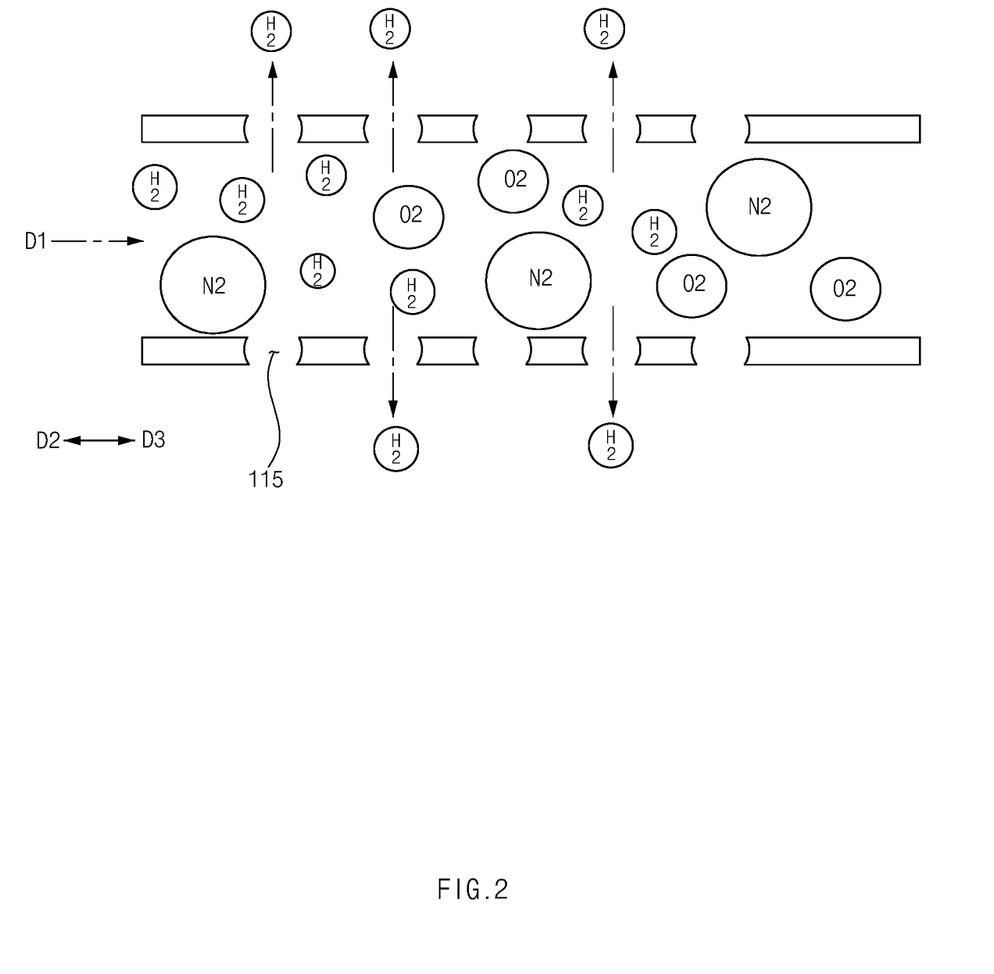
FIG. 2 is an enlarged cross-sectional view of a part of a body with a fine size and illustrates fine holes provided in the body according to Embodiment 1 of the present disclosure.

FIG. 1 is a cross-sectional view illustrating a concentration reducing apparatus according to Embodiment 1 of the present disclosure. FIG. 2 is an enlarged cross-sectional view of a part of a body with a fine size and illustrates fine holes provided in the body according to Embodiment 1 of the present disclosure.

As illustrated in FIG. 1, a concentration reducing apparatus according to Embodiment 1 of the present disclosure includes a body 11. The body 11 may have an inner flow path 111.

The inner flow path 111 may be provided to allow an exhaust gas containing a target fluid to flow in a discharge direction D1. The target fluid may be a fluid having a concentration configured to be reduced by the concentration reducing apparatus. The exhaust gas is a gas containing several fluids including the target fluid and may be a fluid which is a by-product produced by a predetermined energy reaction.

The body 11 preferably is made of a porous material, such that the target fluid may be discharged to an outside of the body 11 through the body 11 from the inner flow path 111. As illustrated in FIG. 2, the body 11 may be made of a porous material having predetermined fine holes 115. A pore size of the body 11 may be defined by a size of the fine hole 115 of the body 11, and the fine hole 115 preferably has a diameter that allows the target fluid to pass through the fine hole 115. FIG. 2 illustrates an example in which the hydrogen in the exhaust gas containing the hydrogen is discharged through the fine holes 115.

As illustrated in FIG. 1, the exhaust gas may form a predetermined internal pressure in the inner flow path 111 while flowing along the inner flow path 111. A part of the exhaust gas may be discharged to an outside of the body 11 through the body 11 by the internal pressure formed in the inner flow path 111.

The pore size of the body 11 is set such that the target fluid may pass through the body 11. As a result, the target fluid may be discharged to the outside of the body 11 through the body 11. Hereinafter, the discharge of the target fluid to the outside of the body 11 through the body 11 from the inner flow path 111 is referred to as a 'selective discharge'.

Since a part of the target fluid flowing through the inner flow path 111 is discharged to the outside of the body 11 through the body 11, it is possible to reduce a concentration of the exhaust gas at an end of the inner flow path 111 in the discharge direction D1. The concentration of the exhaust gas may be defined as a ratio between the target fluid and the exhaust gas.

Meanwhile, a thickness T of the body 11 may be 2 mm to 20 mm. Since the thickness T of the body 11 is 2 mm to 20 mm, it is possible to more easily discharge the target fluid to the outside of the body 11 through the body 11 from the inner flow path 111, and it is possible to prevent the body 11 from being curved in a direction intersecting the discharge direction D1.

The pore size of the body 11 may be 10 µm to 100 µm. Since the pore size of the body 11 is 10 µm to 100 µm, the hydrogen gas, which may be a part of the exhaust gas, may be more easily discharged selectively.

In addition, a first body 11A and a second body 11B, which correspond to a first flow path part 112 and a second flow path part 113 which are separated by a partition 12 to be described below, may be provided to have different pore sizes so that different amounts of target fluid are discharged through the first body 11A and the second body 11B. For example, the pore size of the first body 11A is larger than the pore size of the second body 11B, such that the selective discharge from the first flow path part 112 may be more easily performed than the selective discharge from the second flow path part 113.

Partition 12

The concentration reducing apparatus according to Embodiment 1 of the present disclosure may further include the partition 12. The partition 12 may include a partition wall 121 and a partition wall hole 122.

The partition wall 121 may be disposed to block the inner flow path 111. Since the partition wall 121 is provided, the inner flow path 111 may be divided into the first flow path part 112 and the second flow path part 113 in the discharge direction D1.

The partition wall 121 may have the partition wall hole 122 that penetrates the partition wall 121 in the discharge direction D1. The exhaust gas may flow from the first flow path part 112 to the second flow path part 113 through the partition wall hole 122.

The partition 12 hinders the flow of the exhaust gas from the first flow path part 112 to the second flow path part 113, such that the internal pressure of the first flow path part 112 may be higher than the internal pressure of the second flow path part 113. Since the partition 12 makes the internal pressure of the first flow path part 112 higher than the internal pressure of the second flow path part 113, the selective discharge from the first flow path part 112 may be more easily performed than the selective discharge from the second flow path part 113.

Meanwhile, a length L1 of the first flow path part 112 in the discharge direction D1 may be different from a length L2 of the second flow path part 113 in the discharge direction D1. For example, as illustrated in FIG. 1, the length L1 of the first flow path part 112 may be longer than the length L2 of the second flow path part 113.

Since the lengths L1 and L2 of the first and second flow path parts 112 and 113 are different from each other, the amount of the target fluid discharged from the first body 11A may be different from the amount of the target fluid discharged from the second body 11B. As a result, a degree of the selective discharge performed from the first flow path part 112 may be different from a degree of the selective discharge performed from the second flow path part 113.

Figure 3:
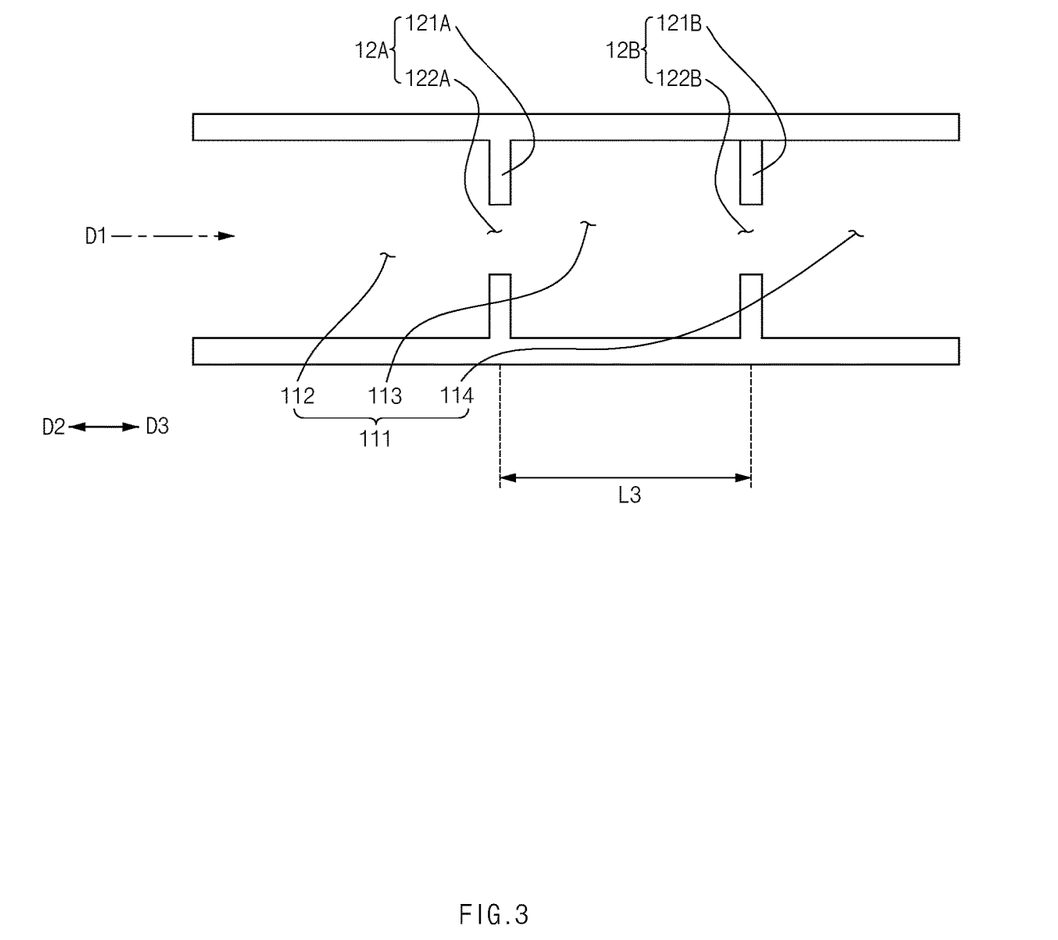
FIG. 3 is a cross-sectional view illustrating a concentration reducing apparatus according to a modified example of Embodiment 1 of the present disclosure.

FIG. 3 is a cross-sectional view illustrating a concentration reducing apparatus according to a modified example of Embodiment 1 of the present disclosure. The concentration reducing apparatus according to the present modified example may include a first partition 12A and a second partition 12B. The first partition 12A and the second partition 12B are spaced apart from each other and may block the inner flow path 111. Since the first partition 12A and the second partition 12B are provided in the inner flow path 111, the inner flow path 111 may be divided into the first flow path part 112, the second flow path part 113, and a third flow path part 114.

The first partition 12A may include a first partition wall 121A and a first partition wall hole 122A. The first partition wall 121A may divide the inner flow path 111 into the first flow path part 112 and the second flow path part 113 while blocking the inner flow path 111.

The first partition wall hole 122A may be a hole disposed in the first partition wall 121A and penetrating the first partition wall 121A in the discharge direction D1. The first partition wall hole 122A may allow the exhaust gas to flow from the first flow path part 112 to the second flow path part 113 through the first partition wall hole 122A.

The second partition 12B may include a second partition wall 121B and a second partition wall hole 122B. The second partition wall 121B is spaced apart from the first partition wall 121 in the discharge direction D1 and may be disposed to block the inner flow path 111. The second partition wall 121B may divide the inner flow path 111 into the second flow path part 113 and the third flow path part 114.

The second partition wall hole 122B may be a hole disposed in the second partition wall 121B and penetrating the second partition wall 121B in the discharge direction D1. The second partition wall hole 122B may allow the exhaust gas to flow from the second flow path part 113 to the third flow path part 114 through the second partition wall hole 122B.

The concentration reducing apparatus according to the present modified example has the second partition 12B spaced apart from the first partition 12A in the discharge direction D1, and as a result, it is possible to hinder the flow of the fluid to the third flow path part 114 after the fluid is introduced into the second flow path part 113 through the first partition wall hole 122A. As a result, the internal pressure of the second flow path part 113 may be higher than the internal pressure of the third flow path part 114, and the selective discharge from the second flow path part 113 may be more easily performed than the selective discharge from the third flow path part 114.

Meanwhile, a diameter of the first partition wall hole 122A and a diameter of the second partition wall hole 122B may be different from each other. Since the diameter of the first partition wall hole 122A and the diameter of the second partition wall hole 122B are different from each other, the internal pressure of the first flow path part 112, the internal pressure of the second flow path part 113, and the internal pressure of the third flow path part 114 may be different from one another. As a result, a degree of the selective discharge performed from the first flow path part 112, a degree of the selective discharge performed from the second flow path part 113, and a degree of the selective discharge performed from the third flow path part 114 may be different from one another.

A distance L3 between the first partition 12A and the second partition 12B spaced apart from each other may be 10 mm to 1,000 mm.

If the distance L3 between the first partition 12A and the second partition 12B is less than 10 mm, an internal volume defined by the second flow path part 113 formed by the first partition 12A and the second partition 12B may be excessively small, and thus the internal pressure formed by the exhaust gas in the second flow path part 113 is rapidly increased, which may cause several problems.

In addition, if the distance L3 between the first partition 12A and the second partition 12B is more than 1,000 mm, there is a problem in that the internal pressure formed in the second flow path part 113 has a gradient so that the internal pressure becomes higher toward a portion in the vicinity of the second partition 12B. Therefore, since the distance L3 between the first partition 12A and the second partition 12B is 1,000 mm or less, a level at which the selective discharge is performed from the second flow path part 113 may be maintained, and the internal pressure formed in the second flow path part 113 may be maintained so that the internal pressure may be relatively uniformly formed in the second flow path part.

Since the distance L3 between the first partition 12A and the second partition 12B spaced apart from each other is 10 mm to 1,000 mm, it is possible to prevent the internal pressure formed in the second flow path part 113 from becoming rapidly higher than the internal pressure formed in the first flow path part 112, and it is possible to maintain the relatively uniform internal pressure in the second flow path part 112 at a level at which the selective discharge is allowed.

Figure 4:
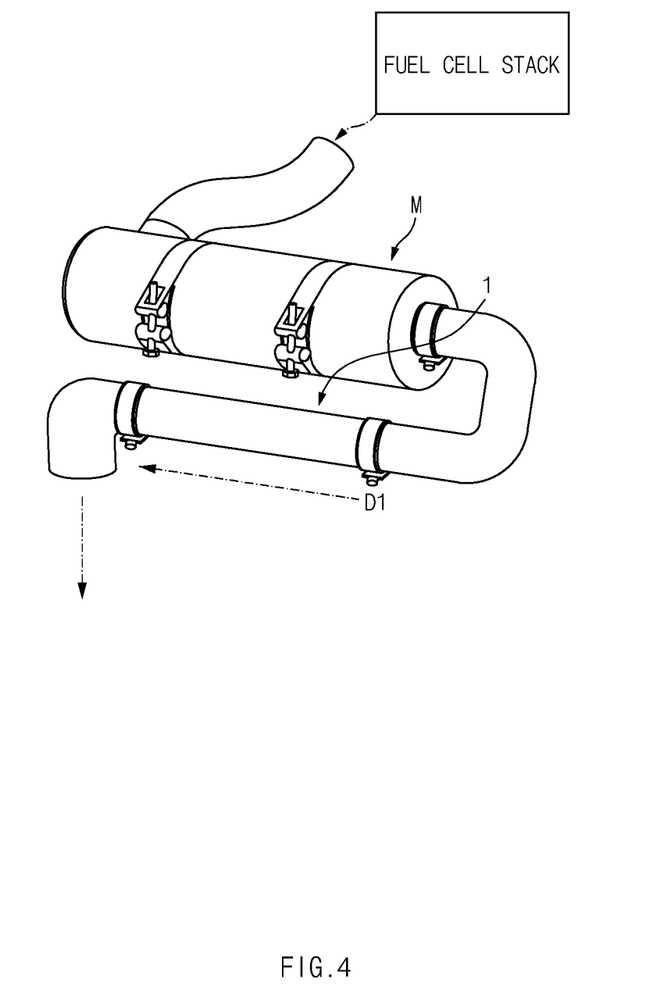
FIG. 4 is a perspective view schematically illustrating a fuel cell stack, a discharge tube, and a flow direction of an exhaust gas.

Meanwhile, FIG. 4 is a perspective view schematically illustrating a fuel cell stack, a discharge tube, and a flow direction of an exhaust gas. As illustrated in FIG. 4, a concentration reducing apparatus 1 according to Embodiment 1 of the present disclosure may be used to reduce a concentration of an exhaust gas in a vehicle using a fuel cell stack. That is, the exhaust gas according to the present disclosure may be an exhaust gas containing a hydrogen gas, air, and water which are by-products produced from an electrochemical reaction in the fuel cell stack, and the target fluid may be the hydrogen gas.

The concentration reducing apparatus 1 may be a part of a discharge tube of a fuel cell system. The hydrogen gas, the air, and the water passing through the fuel cell stack are collected in the single tube and constitute the exhaust gas, and the exhaust gas is introduced into a muffler M. The exhaust gas discharged from the muffler M may be introduced into the concentration reducing apparatus 1. In the concentration reducing apparatus 1, only the hydrogen gas is selectively discharged to the outside of the body 11 (see FIG. 1) through the body 11 (see FIG. 1) from the inner flow path 111 (see FIG. 1), and as a result, it is possible to reduce a concentration of hydrogen in the exhaust gas measured at the end of the concentration reducing apparatus in the discharge direction D1.

Embodiment 2

Figure 5:
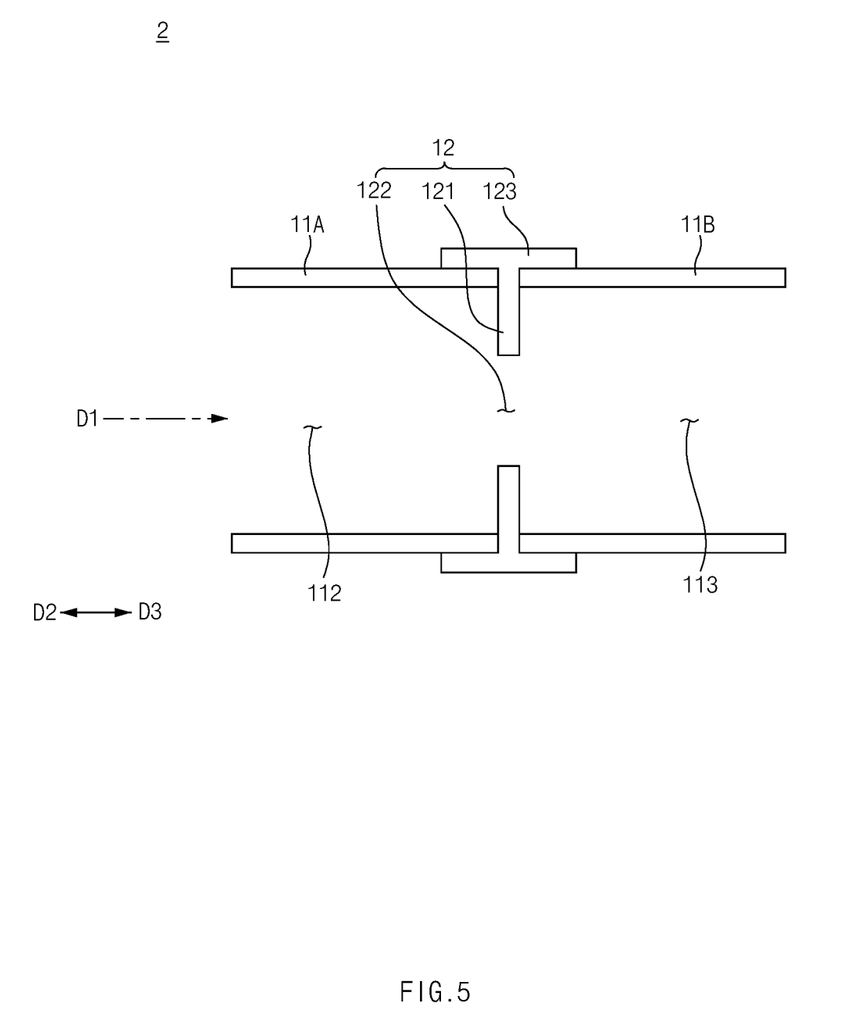
FIG. 5 is a cross-sectional view illustrating a concentration reducing apparatus according to Embodiment 2 of the present disclosure.

FIG. 5 is a cross-sectional view illustrating a concentration reducing apparatus according to Embodiment 2 of the present disclosure. Hereinafter, a concentration reducing apparatus 2 according to Embodiment 2 of the present disclosure will be described with reference to FIG. 5. The concentration reducing apparatus 2 according to Embodiment 2 differs from the concentration reducing apparatus 1 according to Embodiment 1 in terms of a structure of the first body 11A, a structure of the second body 11B, and a structure of the partition 12 disposed between the first body 11A and the second body 11B. The components identical or corresponding to the components according to Embodiment 1 are denoted by the identical or corresponding reference numerals, and a specific description thereof will be omitted.

As illustrated in FIG. 5, the body 11 according to Embodiment 2 of the present disclosure may include the first body 11A and the second body 11B. The first body 11A and the second body 11B may have the first flow path part 112 and the second flow path part 113, respectively. Each of the first body 11A and the second body 11B may be made of a porous material.

The first flow path part 112 may be provided to allow the exhaust gas containing the target fluid to flow in the discharge direction D1.

The second body 11B may be spaced apart from the first body 11A in the discharge direction D1. In addition, the second body 11B may have the second flow path part 113 through which the exhaust gas containing the target fluid flows in the discharge direction D1.

As described below, the first body 11A and the second body 11B may be disposed in such a manner that the first flow path part 112 and the second flow path part 113 communicate with each other through the partition 12.

The partition 12 may be disposed between the first body 11A and the second body 11B. The partition wall 121 may be disposed to block an end of the first body 11A in a downstream direction D3 and an end of the second body 11B in an upstream direction D2. The partition wall hole 122 may be disposed in the partition wall 121 to allow the first flow path part 112 and the second flow path part 113 to communicate with each other. The partition 12 may further include connecting members 123.

The connecting member 123 may extend from a rim of the partition wall 121 to the first body 11A and the second body 11B. When viewing the connecting member 123 in the discharge direction D1 or in a direction-D1 opposite to the discharge direction D1, the connecting member 123 may be shaped and sized such that the first body 11A or the second body 11B may be fitted into the connecting member 123. The connecting member 123 may be provided such that the end of the first body 11A in the downstream direction D3 and the end of the second body 11B in the upstream direction D2 are fitted into the connecting member 123.

Since the connecting members 123 are provided, the partition 12 may be disposed between the first body 11A and the second body 11B to fix the first body 11A and the second body 11B in a predetermined direction. In addition, the diameter of the partition wall hole 122 may be adjusted by replacing the previous partition 12 with another partition 12 having the partition wall hole 122 having the diameter different from the diameter of the previous partition 12, such that a difference in relative internal pressure between the first flow path part 112 and the second flow path part 113 may be changed. In addition, a degree of the 'selective discharge' performed from any one of the first flow path part 112 and the second flow path part 113 may be changed by replacing any one of the previous first body 11A and the previous second body 11B with the body 11 having the different pore size or length from the previous body.

Embodiment 3

Figure 6:
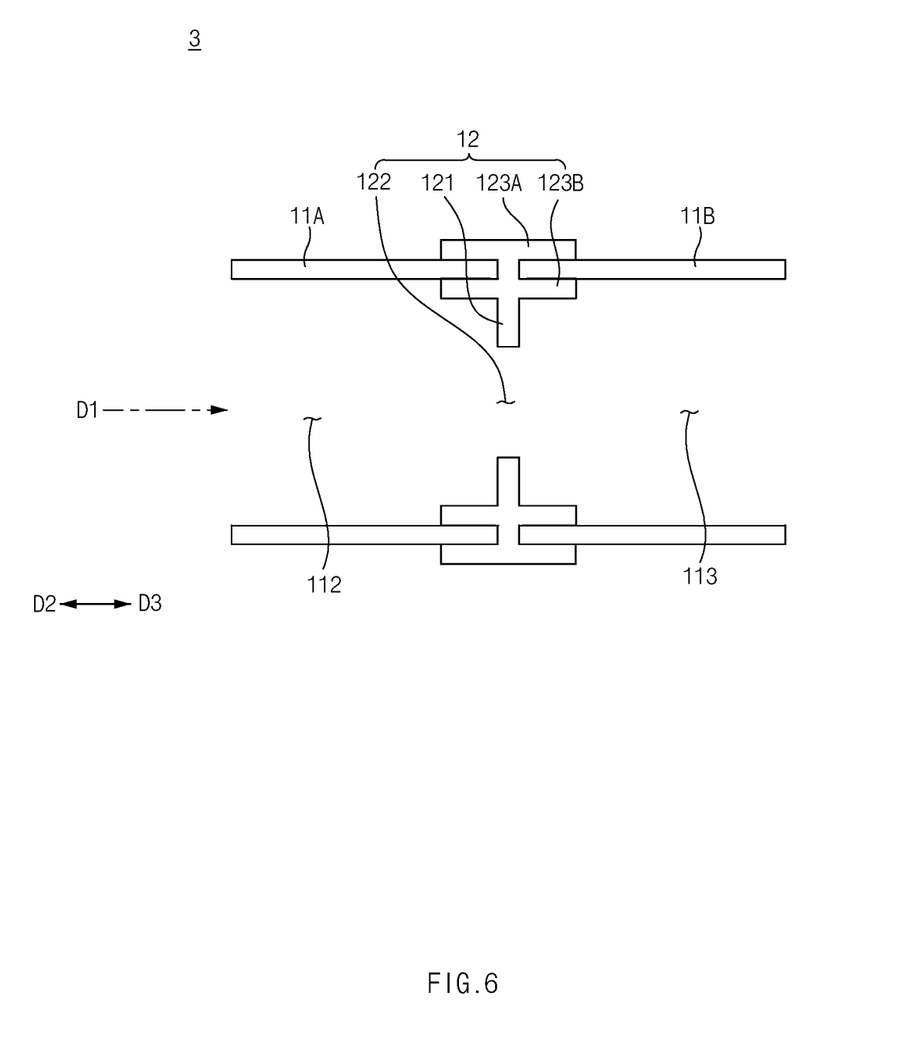
FIG. 6 is a cross-sectional view illustrating a concentration reducing apparatus according to Embodiment 3 of the present disclosure.

FIG. 6 is a cross-sectional view illustrating a concentration reducing apparatus according to Embodiment 3 of the present disclosure. Hereinafter, a concentration reducing apparatus 3 according to Embodiment 3 of the present disclosure will be described with reference to FIG. 6. The concentration reducing apparatus 3 according to Embodiment 3 differs from the concentration reducing apparatus 2 according to Embodiment 2 in terms of first connecting members 123A and second connecting members 123B. The components, which are identical or correspond to the components of the concentration reducing apparatus 2 according to Embodiment 2, are denoted by the identical or corresponding reference numerals, and a specific description thereof will be omitted.

As illustrated in FIG. 6, the concentration reducing apparatus 3 according to Embodiment 3 of the present disclosure may further include the first connecting members 123A and the second connecting members 123B.

The first connecting member 123A may extend from the rim of the partition wall 121 toward the first body 11A and the second body 11B.

The second connecting member 123B may be disposed to be spaced apart from the first connecting member 123A toward the partition wall hole. The second connecting member 123B may extend from the rim of the partition wall 121 toward the first body 11A and the second body 11B.

Since the first connecting members 123A and the second connecting members 123B are provided, the end of the first body 11A in the downstream direction D3 and the end of the second body 11B in the upstream direction D2 may be fitted between the first connecting members 123A and the second connecting members 123B. As a result, the first body 11A, the second body 11B, and the partition may be more securely fastened to one another.

According to the present disclosure, since the predetermined target fluid is discharged through the body, the concentration of the predetermined target fluid measured at the downstream end of the body may be reduced.

The above description is simply given for illustratively describing the technical spirit of the present disclosure, and those skilled in the art to which the present disclosure pertains will appreciate that various changes and modifications are possible without departing from the essential characteristic of the present disclosure. Therefore, the embodiments of the present disclosure are provided for illustrative purposes only but not intended to limit the technical concept of the present disclosure. The scope of the technical concept of the present disclosure is not limited thereto. The protective scope of the present disclosure should be construed based on the following claims, and all the technical spirit in the equivalent scope thereto should be construed as falling within the scope of the present disclosure.

What is claimed is:

1. A concentration reducing apparatus comprising:
   a body having an inner flow path through which an exhaust gas containing a target fluid flows in a predetermined discharge direction,
   wherein the body is arranged downstream of an outlet of a fuel cell stack and configured to guide the exhaust gas discharged from the fuel cell stack to the outside of the fuel cell stack, and
   wherein the body is made of a porous material that allows a selective discharge of the target fluid in order to selectively discharge the target fluid to the outside of the body.

2. The concentration reducing apparatus of claim 1, further comprising:
   a partition comprising:
   a partition wall configured to block the inner flow path to divide the inner flow path into a first flow path part and a second flow path part in the discharge direction; and
   a partition wall hole formed in the partition wall and provided to allow the exhaust gas to pass through the partition wall hole in the discharge direction,
   wherein the partition is provided to make an internal pressure of the first flow path part higher than an internal pressure of the second flow path part.

3. The concentration reducing apparatus of claim 2, wherein the partition wall hole has a diameter smaller than an inner diameter of the inner flow path so that the internal pressure of the first flow path part is higher than the internal pressure of the second flow path part.

4. The concentration reducing apparatus of claim 1, wherein when a size of a fine hole of the body, which is provided to allow the target fluid to pass through the fine hole, is referred to as a pore size, the body has the pore size of 10 μm to 100 μm so that hydrogen, which is the target fluid, passes through the fine hole.

5. The concentration reducing apparatus of claim 2, wherein when a size of a fine hole of the body, which is provided to allow the target fluid to pass through the fine hole, is referred to as a pore size, a first body of the body, which corresponds to the first flow path part, and a second body of the body, which corresponds to the second flow path part, are provided to allow the target fluid to pass therethrough and have different pore sizes such that the amount of the target fluid discharged from the first body is different from the amount of the target fluid discharged from the second body.

6. The concentration reducing apparatus of claim 5, wherein the pore size of the first body is larger than the pore size of the second body so that the amount of the target fluid discharged to the outside of the first body through the first body from the first flow path part is larger than the amount of the target fluid discharged to the outside of the second body through the second body from the second flow path part.

7. The concentration reducing apparatus of claim 1, wherein the body has a thickness of 2 mm to 20 mm.

8. The concentration reducing apparatus of claim 2, wherein a length of the first flow path part in the discharge direction is different from a length of the second flow path part in the discharge direction so that the amount of the target fluid discharged from a first body of the body, which corresponds to the first flow path part, is different from the amount of the target fluid discharged from a second body of the body, which corresponds to the second flow path part.

9. The concentration reducing apparatus of claim 1, comprising:
a first partition and a second partition configured to block the inner flow path and disposed in the inner flow path so as to be spaced apart from each other in order to divide the inner flow path into a first flow path part, a second flow path part, and a third flow path part in the discharge direction,
wherein the first partition comprises:
a first partition wall configured to block the inner flow path; and
a first partition wall hole penetratively formed in the first partition wall, and
wherein the second partition comprises:
a second partition wall spaced apart from the first partition wall in the discharge direction and configured to block the inner flow path; and
a second partition wall hole penetratively formed in the second partition wall.

10. The concentration reducing apparatus of claim 9, wherein a diameter of the first partition wall hole of the first partition is different from a diameter of the second partition wall hole of the second partition so that an internal pressure of the first flow path part, an internal pressure of the second flow path part, and an internal pressure of the third flow path part are different from one another.

11. The concentration reducing apparatus of claim 9, wherein a distance between the first partition and the second partition spaced apart from each other is 10 mm to 1,000 mm.

12. The concentration reducing apparatus of claim 2, wherein the body comprises:
a first body having the first flow path part and made of a porous material; and
a second body disposed to be spaced apart from the first body in the discharge direction, having the second flow path part, and made of a porous material, and
wherein the partition disposed between the first and second bodies further comprises a pair of connecting members extending from a rim of the partition wall toward the first and second bodies and provided such that a downstream end of the first body and an upstream end of the second body are fitted into the pair of connecting members, respectively.

13. The concentration reducing apparatus of claim 2, wherein the body comprises:
a first body having the first flow path part and made of a porous material; and
a second body disposed to be spaced apart from the first body in the discharge direction, having the second flow path part, and made of a porous material, and
wherein the partition disposed between the first and second bodies further comprises:
a pair of first connecting members extending from a rim of the partition wall toward the first and second bodies; and
a pair of second connecting members disposed to be spaced apart from the first connecting member toward the partition wall hole and extending from the partition wall toward the first and second bodies, such that a downstream end of the first body and an upstream end of the second body are fitted between the first connecting members and the second connecting members.

14. A concentration reducing apparatus for a fuel cell vehicle, the concentration reducing apparatus comprising:
a body having an inner flow path through which an exhaust gas, in a fuel cell vehicle, containing a hydrogen gas flows in a predetermined discharge direction; and
a partition comprising:
a partition wall configured to block the inner flow path to divide the inner flow path into a first flow path part and a second flow path part in the discharge direction; and
a partition wall hole formed in the partition wall and provided to allow the exhaust gas to pass through the partition wall hole in the discharge direction,
wherein the body is arranged downstream of an outlet of a fuel cell stack and configured to guide the exhaust gas discharged from the fuel cell stack to the outside of the fuel cell stack, and
wherein the body is made of a porous material that allows a selective discharge of the hydrogen gas in order to selectively discharge the hydrogen gas to the outside of the body.

* * * * *